Aug. 15, 1933.          D. H. GOODWILLIE ET AL          1,922,620
                      DEVICE FOR CUTTING SHEET MATERIAL
            Original Filed May 12, 1928       5 Sheets-Sheet 2

Inventors
David H. Goodwillie
Emmett L. Walters
By Owen + Owen
Attorneys

Inventors
David H. Goodwillie
Emmett L. Walters
By Owen & Owen
Attorneys

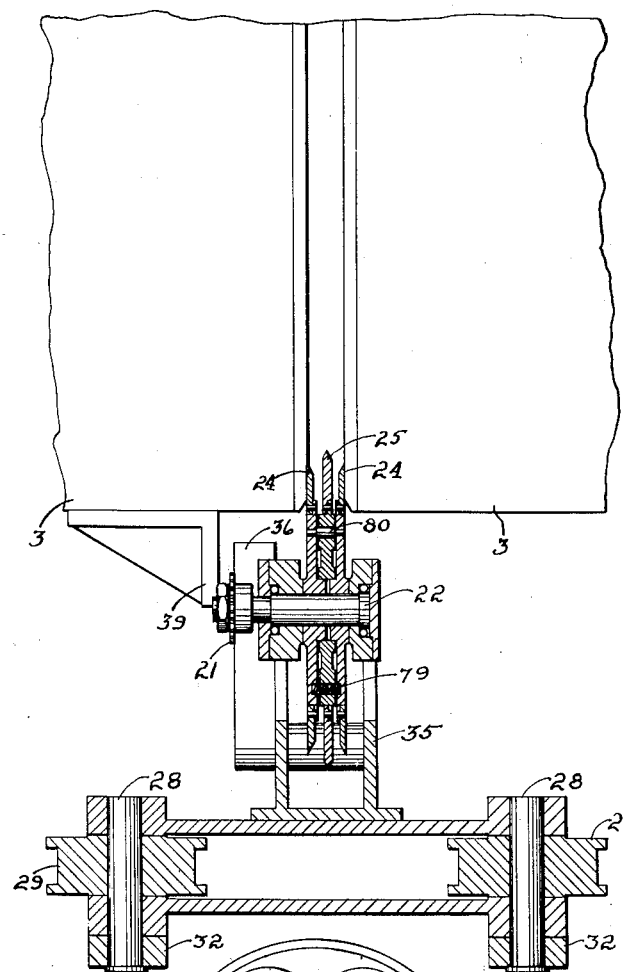
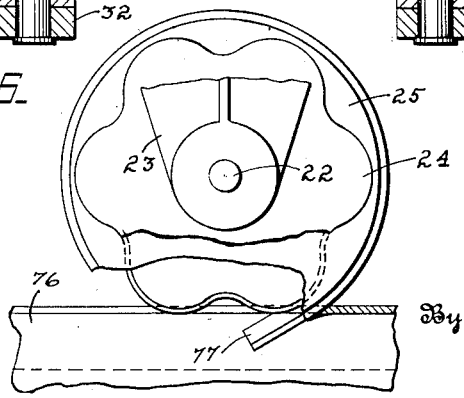

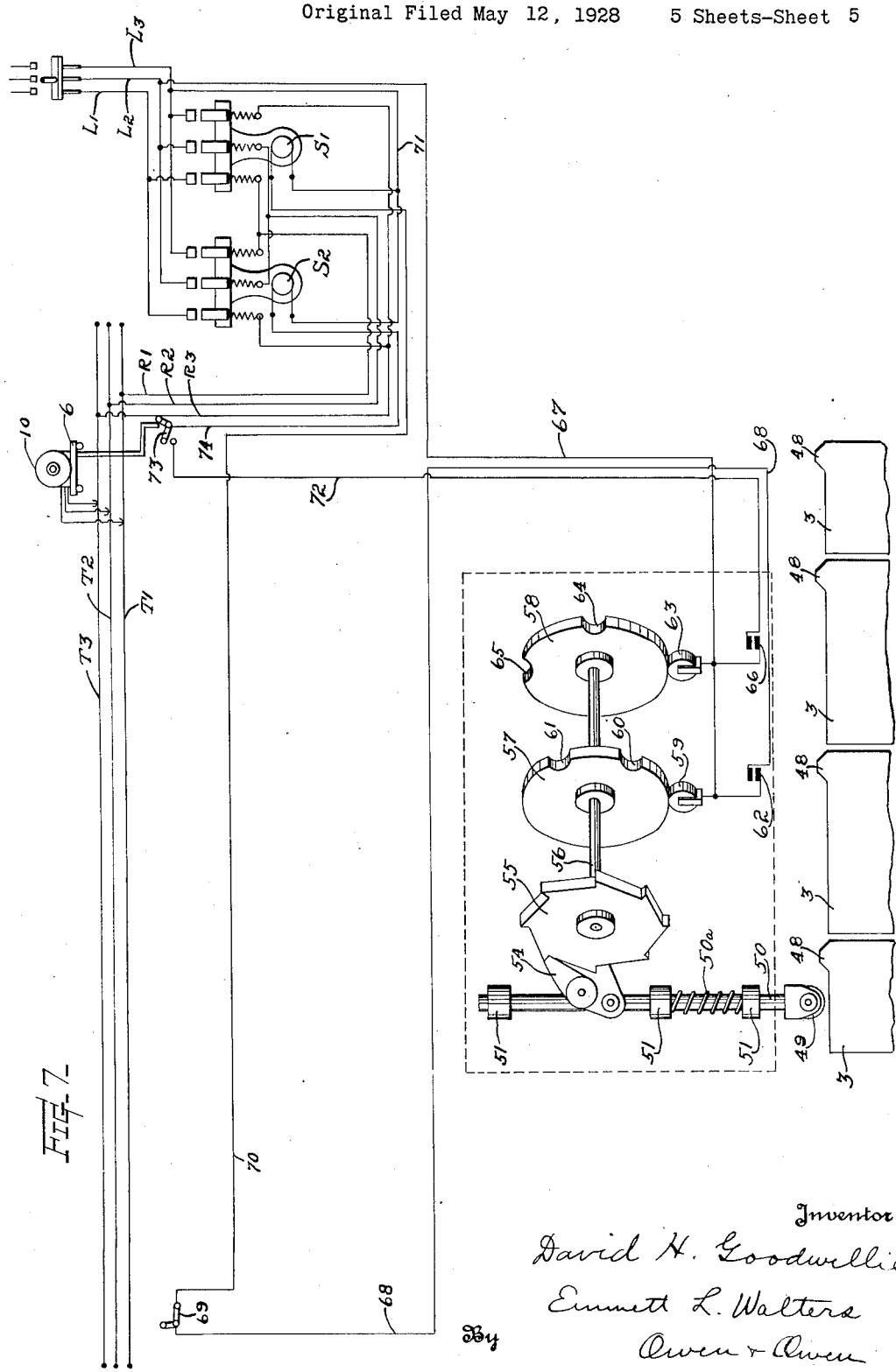

Patented Aug. 15, 1933

1,922,620

UNITED STATES PATENT OFFICE 1,922,620

DEVICE FOR CUTTING SHEET MATERIAL

David H. Goodwillie and Emmett L. Walters, Toledo, Ohio, assignors, by mesne assignments, to Libbey-Owens-Ford Glass Company, Toledo, Ohio, a Corporation of Ohio Original application May 12, 1928, Serial No. 277,115. Divided and this application May 21, 1930. Serial No. 454,254

15 Claims.  (Cl. 49—14)

This invention relates to novel and improved means and method for cutting glass sheets and the like into separate units, while in a plastic condition. Although the invention has been developed in connection with the manufacture of plate glass, it is apparent that similar apparatus may also be used advantageously in the cutting of window glass or sheet glass in plastic condition, and in the cutting of other sheet material of a similar nature.

It is well known that in the art of glass making, cutting devices have been heretofore used for severing rolled sheet glass while still in a plastic condition, but such devices have been usually unsatisfactory, either on account of their severe mechanical action which produces shocks or strains in the cutting and supporting mechanism, or by reason of the unsatisfactory nature of the cut produced by such cutting means, especially the nature and character of the edge formed by the cutting tool on the sheet of glass remaining on the supporting tables. It is very important in the manufacture of plate glass that the edge produced by any cutting tool on the main body of the glass sheet shall be such as will permit the sheet of glass to be subsequently pushed through the annealing ovens and leers by the stowing tools which are in general use. A poorly formed edge on a sheet of glass makes more hazardous the pushing of the glass from one position to another in the annealing ovens. The present invention produces a type of cut and a character of edge remaining on the sheet, which is particularly suited for effective operation in the subsequent pushing or stowing of the glass plates.

The cutting apparatus, which constitutes the subject matter of the invention, may be used to cut and divide into separate units plate glass in plastic condition, which has been formed in sheets by means of any of the usual rolling or casting processes, the glass which is to be cut being carried or supported on a number of successive tables, preferably of cast iron, and set end to end in such a manner that a small gap is provided between the front of one table and the rear of the preceding table, or on a single table provided with proper recesses to form cutting gaps through which the cutting tool is driven to cut out a strip of glass approximately the width of said gap, allowing it to fall or to be removed by other means.

The cutting apparatus divides the sheet, as originally formed, into separate units of relatively smaller size, so that the independent unit sheets or plates so produced may be handled and transferred to annealing ovens of the usual type more readily than would be possible with the original sheet, which is ordinarily of a size much beyond the width of the usual type of annealing oven. It has been found convenient to roll out a sheet between fifty and sixty feet long, from which two unit plates are cut with square ends, so that they may be subsequently stowed in the leer or annealing oven with the usual tools.

The cutting or severing of the glass sheets in plastic condition has heretofore been attempted by the use of shearing cutters which act as knives and drop through the glass and into the gap between the tables and thus shear out a narrow strip of glass within the limits of the gap. Various roller and rotary cutting means have also been employed at various times to cut out a narrow strip of glass between the table edges in the gap as above disclosed.

In none of the cutting means heretofore employed, however, have difficulties of operation and maintenance been entirely overcome, nor have any of them produced a type and character of edge on the cut glass which is desirable and necessary for the subsequent handling of the separate sheets by pushing or stowing.

Bearing in mind the objections to previous cutting means, as above described, the general object of our invention is to provide an improved device for the purpose stated, and improved means for operating the same, which will to a large extent obviate the difficulties which have been encountered, and particularly to provide a cutting mechanism which is accurate and reliable in its operation and which will cut the glass cleanly without any tendency to cause waves or wrinkles therein.

The present application is a division of our earlier application Serial Number 277,115 filed May 12, 1928.

For a more complete understanding of our invention and the advantages resulting therefrom, the same will be specifically explained in connection with the accompanying drawings, which illustrate one embodiment thereof.

In the drawings:—

Fig. 4 is a horizontal section taken substantially on the line 4—4 of Fig. 3, illustrating particularly the cutting elements and their relation to the tables which support the glass.

Fig. 5 is a vertical section through the cutting elements and cutter carriage as indicated by the line 5—5 of Fig. 3, but showing the cutters traversing the ends of the tables.

Fig. 6 is a detail view of the cutting element, showing the same in side elevation during the process of cutting.

Fig. 7 is a diagrammatic view of the wiring for controlling the motor which operates the cutters, and showing in connection therewith the mechanism for actuating the starting switches.

Figure 1:
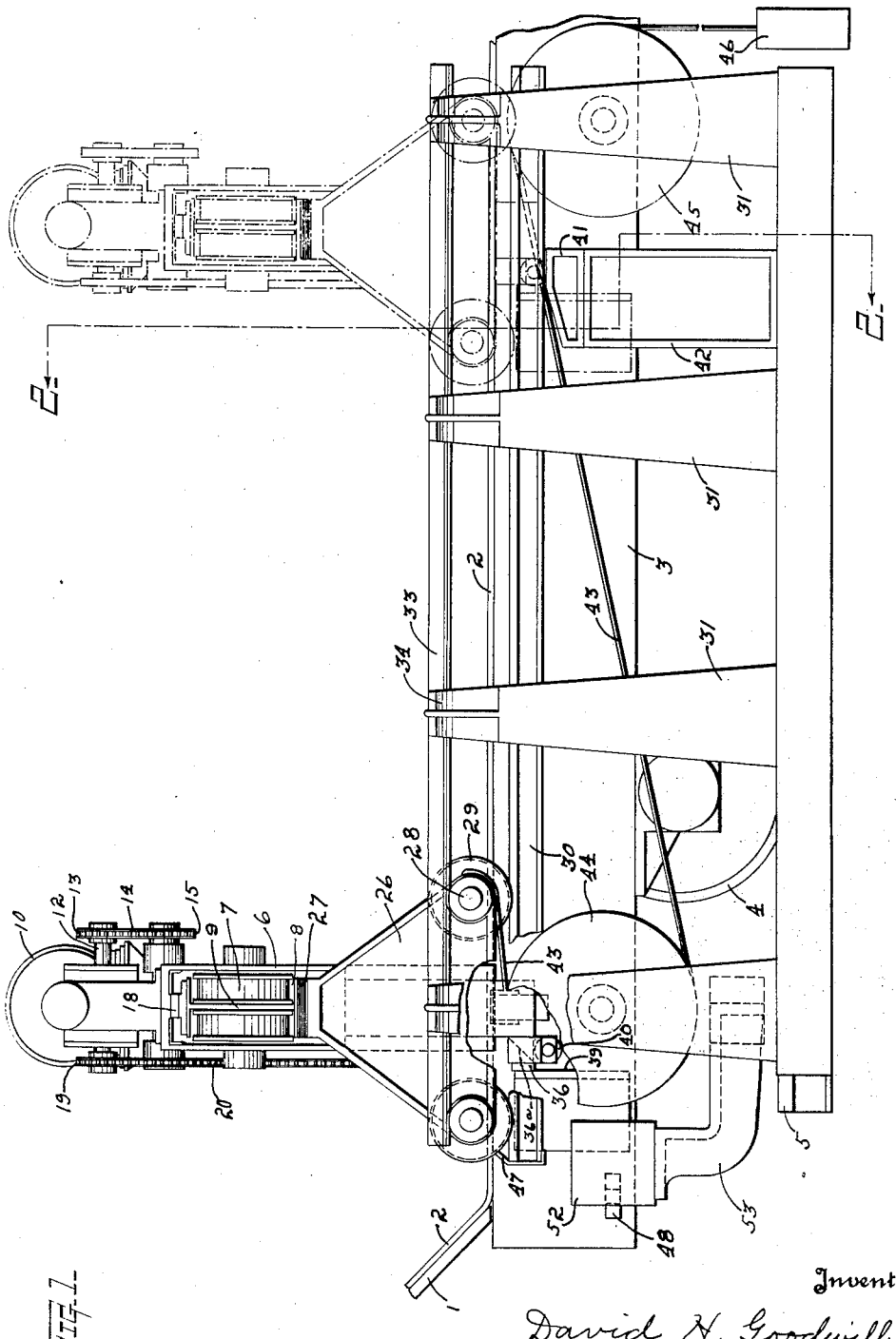
Figure 1 is a side elevation of the invention.
Figure 2:
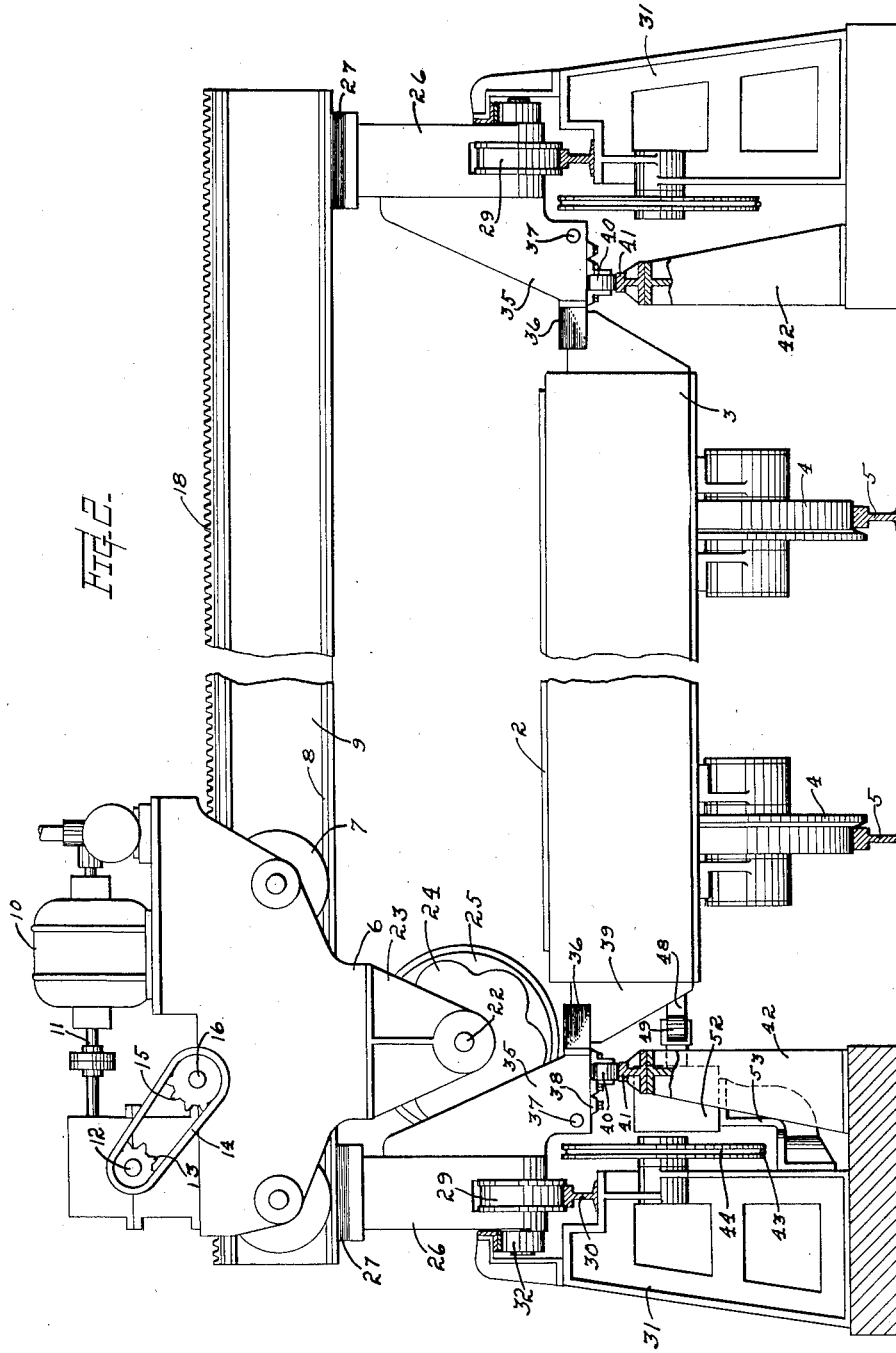
Fig. 2 is a transverse section taken substantially on the line 2—2 of Fig. 1.
Figure 3:
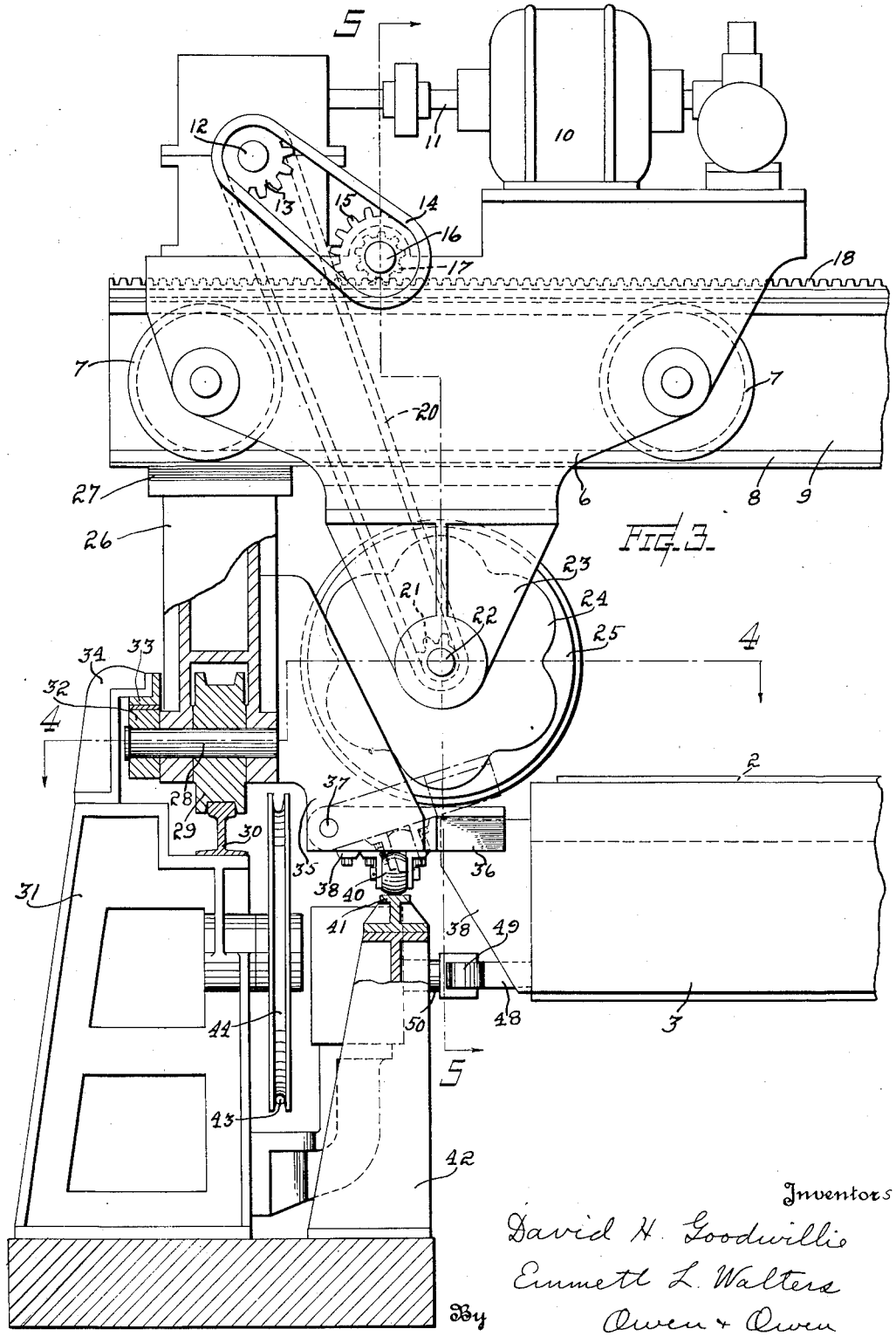
Fig. 3 is a view similar to Fig. 2, but on a larger scale, and with parts broken away, or shown in dotted lines, in order to show more completely the means for operating and guiding the cutting elements.

As explained above, the present invention may be used in connection with any of the usual processes for manufacturing sheet glass. In Fig. 1 the reference numeral 1 indicates the delivery end of a rolling machine from which the sheet 2 is rolled out and delivered upon the surfaces of a series of tables 3 which advance in synchronism with the rolling machine. It is customary to use two intermediate tables, each having a surface of the same length as the plate to be cut, and two short end tables, which are adapted to receive the waste ends. These tables are supported by suitable wheels 4 on tracks 5 and are adapted to be advanced continuously with each batch of glass, and to be returned to their initial position after the glass has been transferred therefrom to the annealing ovens.

A cutter carriage 6 is disposed above the path of the tables 3, and is provided with supporting wheels 7 which are adapted to ride on tracks 8 disposed on opposite sides of a transverse I-beam 9. The carriage 6 supports a motor 10, whose shaft 11 drives a jack shaft 12 which is mounted in suitable bearings on the carriage 6. Suitable mechanism is provided for moving the carriage 6 back and forth on the tracks 8. This mechanism, in the present instance, includes a sprocket wheel 13 secured on the shaft 12 and connected by a sprocket chain 14 to a sprocket wheel 15, secured on a shaft 16. A pinion 17 is secured to the shaft 16 and engages a rack 18 carried on the I-beam 9, so that when the shaft 12 is driven, first in one direction and then in the other, the carriage 6 moves to and fro transversely above the path of the tables 3.

Another sprocket wheel 19, secured to the shaft 12, is connected by a sprocket chain 20 to a sprocket wheel 21 secured to a cutter shaft 22, which is journaled in brackets 23 secured to the lower side of the carriage 6. Keyed to the shaft 22 are two similar serrated or scalloped cutting disks 24, in spaced relation to each other, and with an intermediate circular cutting disk 25, of greater diameter, secured between them. The purpose of this specific type of cutter will be hereinafter explained.

The transverse beam 9 is supported at each end by a truck frame 26 and a number of shims 27 are provided between the beam and the truck frame so that the elevation of the beam, and consequently the depth of cut may be adjusted.

Each truck frame 26 is provided with axles 28 carrying wheels 29 which are guided for longitudinal movement on rails 30. These rails 30 are parallel to the rails 5 and are supported at opposite sides of the path of the tables by stands 31.

Each axle 28 carries on its outer end a roller 32 adapted to ride beneath a track 33, which is secured to overhanging extensions 34 of the stands 31.

Each truck frame 26 carries a downwardly and inwardly extending bracket 35, on which an arm 36 is pivoted, as shown at 37. This arm is normally held by gravity in a horizontal position, where it rests against a cleat 38 secured to the lower end of the bracket 35. When the arm 36 is in this position, it is in the path of the abutments 39 which are carried by the respective tables. As each abutment 39 engages the arm 36, therefore, the cutter carriage 6 and the cutter will move forwardly in synchronism with the tables.

A roller 40 is mounted on the underside of each arm 36, and after the cutter carriage has been moved forwardly with the table for a predetermined distance, the roller 40 engages a cam track 41, supported on a stand 42 adjacent the path of the table, and raises the arm 36 above the abutment 39, thus permitting the cutter carriage to be returned to its initial position.

A convenient device for causing the return movement of the cutter carriage comprises a cable 43 at each side of the runway. Each cable is secured at one end to the frame 26 and passes rearwardly about a sheave 44 mounted on the rearmost stand 31. From the sheave 44 the cable 43 passes forwardly and over a sheave 45 which is mounted in the foremost stand 31. The front end of the cable 43 is secured to a counterweight 46, which operates in a suitable well provided for the purpose. It will be understood, therefore, that as the carriage 9—26 advances, the counterweights 46 are raised and as soon as the carriage is released from the table it is returned to its initial position by the action of the counterweights. A suitable buffer is provided to stop the carriage at the end of its rearward movement, such a buffer being shown at 47 as secured to the rear end of the rail 30.

The operation of the cutter and its movement across the sheet is effected through the medium of the electric motor 10. This motor, as illustrated, is a reversible alternating current motor and is set in operation by means of cams 48 located on the side of the tables 3. Each cam 48, as illustrated diagrammatically in Fig. 7, is adapted to engage a roller 49 carried at the inner end of a bar 50 slidably mounted in bearings 51 located within a box 52 which may be supported by a bracket 53. The bar 50 carries a pawl 54 which is adapted to engage successively the teeth of a ratchet wheel 55 which is secured on a shaft 56 within the box 52. The ratchet wheel 55 has eight teeth and each time the roller 49 rides over one of the cams 48, the ratchet wheel is advanced the distance of one tooth or through an angle of 45°, the bar 50 being then returned by its spring $50^a$, so that the pawl 54 engages the next tooth.

Secured to the shaft 56 are two disks 57 and 58. A roller 59 is mounted to ride on the periphery of the disk 57, and the latter is provided with two recesses 60 and 61. When the roller 59 enters one of these recesses, it closes a switch 62. A similar roller 63 is adapted to ride on the periphery of the disk 58 which is provided with recesses 64 and 65. When the roller 63 enters one of these recesses, it closes a switch 66.

Current for driving the motor 10 is supplied through line wires, as indicated at $L^1$, $L^2$ and $L^3$, respectively. Two starting switches $S^1$ and $S^2$, adapted to be operated electrically, are provided for connecting the motor for operation in one direction or the other. When the starter switch S¹ is operated, the line wires L¹, L² and L³ are connected to feed wires R¹, R² and R³, respectively, which are in turn connected to trolley wires T¹, T² and T³, respectively. The terminals of the motor 10 are constantly connected to the trolley wires. When the switch S² is operated, the line wires are also connected to the motor 10, but in reverse order.

As the tables begin their advance, the disks 57 and 58 are in the position shown in Fig. 7. As the first cam 48 comes into action, the disks are rotated 45°, until the roller 59 drops into the recess 60 and closes the switch 62. This closes the circuit through switch S¹. This circuit may be traced from the line wire L² through the wire 67, switch 62, wire 68, limit switch 69, wire 70, switch S¹ and wire 71 to line wire L³. It will be understood that each of the limit switches 69 and 73 are closed except when opened by the engagement therewith of an arm 75 mounted on the carriage 6 or some part carried thereby. As soon as the motor is started, therefore, it will move together with the carriage 6 from the position shown in Fig. 7 to the other end of the track, where the limit switch 69 opens and cuts off the current.

When the next cam 48 comes into action, the disks 57 and 58 are moved through another angle of 45° and the roller 63 enters the recess 64, closing the switch 66. The circuit for operating switch S² is then closed. This circuit may be traced from the line wire L² through wire 67, switch 66, wire 72, limit switch 73, which is now closed, wire 74, switch S² and wire 71 to line wire L³. The closing of switch S² operates the motor 10 in a reverse direction and it then travels back to the position shown in Fig. 7.

Upon further advance of the tables, the notches 61 and 65 come successively into play, causing the motor to travel again across the sheet and back again. During the return movement of the tables, after the cut sheets have been stowed in the ovens, the four cams 48 will cause the actuation of the ratchet wheel 55 four times, but since there are no notches on the remaining semi-circumference of the two disks 57 and 58, there will be no actuation of the motor 10.

It will be understood that at the time when the abutments 39 on any one of the tables engage the arms 36 to move the cutter carriage forwardly in synchronism with the advance of the tables, the cutter is located exactly in alinement with the space or recess between two table ends. As the motor is then operated, when the first cam 48 comes into action, the cutter moves from one side of the table to the other side and stops. The truck frames 26, which support the cutter carriage 6, are then released by the raising of the arms 36 and the cutter carriage is returned to its initial position, except that it is at the other side of the path of the tables. As the second pair of abutments 39 come into action, the cutter carriage is again moved forwardly in synchronism with the tables and, by the action of the second cam 48, the cutter is caused to move again across the table, but in the opposite direction, to make another cut. As the third pair of abutments 39 and the third cam 48 come into action, the carriage moves forwardly while the cutter moves across the table to make the third cut. As the fourth cam 48 comes into action, the cutter is moved again across the path of the tables, but this time without making any cut, since the last sheet has now passed beyond the cutter. As the tables 3 are returned to receive the next sheet from the forming rolls, the ratchet wheel 55 is successively actuated to cause the rotation of the disks 57 and 58, restoring them to the position shown in Fig. 7. The rear face of each arm 36 is beveled as indicated at 36ª so that the arms 36 ride over the abutments 39 during the return of the tables.

The construction of the cutter and the mechanism for driving the same have been designed especially with a view to leaving the plate with an edge of the desired character and with the adjacent surface free from waves or wrinkles. As indicated in Figs. 5 and 6, the cutter is adapted to effect a shearing engagement with the adjacent ends of two tables which are provided with ledger plates 76. The central blade 25 first engages the glass, stretching it tightly across the upper edges of the plates 76, and at the same time severing or partially severing it midway of the gap between the table ends. The outward projections or lobes of the blades 24 then come successively into shearing engagement with the plates 76. The ratio of the gearing which advances the cutter across the glass and the gearing which rotates the blades is such that the peripheral speed of the blades is considerably greater than their forward travel. As a consequence, the cutting action is a series of bites, in shearing engagement with the plates 76, while the glass is stretched across or hangs over the same, the cutting stroke being downwardly and to a certain extent rearwardly, so that there is no tendency to push the glass ahead of the cutter, as is the case when the usual rotary cutting disk is used.

The plates 76 are so arranged that they have a slight downward divergence, thus permitting the cut out strip or strips 77 to drop freely into a pan 78 secured in proper position to the end of one of the tables.

The edges of the cutting blades 24 are preferably beveled on the inside so that their flat faces engage the plates 76. They are keyed to the shaft 22 and are kept in close shearing engagement with the plates by coil springs 79 carried by the central cutting blade 25, which is mounted on the hubs of the blades 24 and is caused to rotate therewith by pins 80, which alternate with the springs 79.

In utilizing the principles upon which our invention is based, it will of course be apparent that the specific construction may vary considerably from that shown and described, without departing from the essential features thereof, as claimed.

What we claim is:

1. In a cutting device, the combination with two spaced ledger plates, of a rotary cutter including two spaced disks operable in shearing relation to the respective ledger plates to sever sheet material extending across the same, and a third disk between the other two disks and coaxial therewith, said third disk having a greater diameter than the other two disks.

2. In a cutting device, the combination with two spaced ledger plates, of a rotary cutter including two spaced disks engageable in shearing relation to the respective ledger plates to sever sheet material extending across the same, means for imparting bodily rectilinear movement to said cutter longitudinally of the ledger plates and at the same time positively rotating said cutter to cause a slight rearward peripheral travel of the cutting disks with respect to the ledger plates at the points of contact therewith, and a third disk between the other two disks and coaxial therewith, said third disk having a greater diameter than the other two disks.

3. In a cutting device, the combination with two spaced ledger plates, of a rotary cutter including two spaced disks having peripheral lobes engageable in shearing relation to the respective ledger plates, and means for imparting a bodily rectilinear movement to said cutter longitudinally of the ledger plates and at the same time positively rotating said cutter, said cutter including also a third disk disposed between the other two disks and coaxial therewith, said third disk having a greater diameter than that of the other two disks.

4. In a severing means for sheet glass, a rotary cutter having transversely spaced cutting elements, and means intermediate said elements for engaging the sheets in advance and intermediate the points of engagement thereof by said elements for exerting tension on the engaged portion of the sheet.

5. In a sheet severing means, a sheet support having an opening therein with spaced parallel shearing edges and a rotary cutter having transversely spaced elements operable in shearing relation to said edges and an intermediate sheet engaging member.

6. In a sheet glass severing means, a rotary cutter comprising three transversely spaced co-axial cutter elements with the center one of greater diameter than the other two.

7. In a sheet glass severing means, a rotary cutter having a pair of transversely spaced co-axial cutter elements with an intermediate co-axial disk-like element of larger diameter.

8. In a sheet glass cutting apparatus, a pair of transversely spaced shearing edges, means movable along said edges in shearing coaction therewith, and means movable with the first-mentioned means to engage the glass intermediate said edges to apply tension thereto during the shearing operation.

9. In an apparatus of the class described, a pair of transversely spaced shearing edges, a rotary cutter operating between said edges and having transversely spaced cutter elements for shearing coaction with the respective edges, and spring means interposed between and acting on the elements to yieldingly retain them in shearing coaction with said edges.

10. The method of separating sheet glass into two portions while in a semi-plastic condition, which consists in placing the sheet across a space bounded on opposite sides by parallel shearing edges, applying a tension to the portion of the sheet disposed across said space by the application of a force to the glass substantially midway between said edges and then severing the sheet along said edges to remove a waste strip therefrom.

11. The method of separating a semi-plastic sheet of glass into two portions, which consists in depressing a narrow waste strip between two spaced edges by engaging the glass substantially midway between said edges with mechanical means, and subsequently severing the sheet along said two edges to remove the waste strip thus defined.

12. The method of separating a semi-plastic sheet of glass into two portions, which consists in depressing a narrow waste strip between two spaced edges, and at the same time at least partially severing the glass substantially midway between said edges, and subsequently severing the sheet along said two edges to remove the waste strip thus defined.

13. The method of separating a semi-plastic sheet of glass into two portions, which consists in depressing a narrow waste strip between two spaced edges, and subsequently severing the sheet along said two edges by a succession of bites progressing across the sheet, with a shearing action directed rearwardly with respect to the direction of progression, to remove the waste strip thus defined.

14. The method of separating a semi-plastic sheet of glass into two portions, which consists in depressing a narrow waste strip between two spaced edges, and at the same time at least partially severing the glass substantially midway between said edges, and subsequently severing the sheet along said edges by a succession of bites progressing across the sheet, with a shearing action directed rearwardly with respect to the direction of progression, to remove the waste strip thus defined.

15. In a sheet glass severing device, a cutter comprising two co-axial spaced cutting disks, means for rotating said disks, and means co-operating with said two disks, including a third cutting disk between and of slightly greater diameter than said two disks, to separate the sheet into two portions by removing a waste strip between said two disks.

DAVID H. GOODWILLIE.
EMMETT L. WALTERS.